US012785518B2

(12) United States Patent
Flanders

(10) Patent No.: US 12,785,518 B2
(45) Date of Patent: Nov. 3, 2026

(54) ELECTRIC MOTOR-GENERATOR

(71) Applicant: Wyatt Flanders, Ithaca, NY (US)

(72) Inventor: Wyatt Flanders, Ithaca, NY (US)

( * ) Notice: Subject to any disclaimer, the term of this patent is extended or adjusted under 35 U.S.C. 154(b) by 357 days.

(21) Appl. No.: 18/655,813

(22) Filed: May 6, 2024

(65) Prior Publication Data

US 2025/0343476 A1 Nov. 6, 2025

(51) Int. Cl.

*H02K 11/33* (2016.01)
*H02K 1/02* (2006.01)
*H02K 11/04* (2016.01)
*H02K 11/21* (2016.01)

(52) U.S. Cl.

CPC ............... *H02K 11/33* (2016.01); *H02K 1/02* (2013.01); *H02K 11/04* (2013.01); *H02K 11/21* (2016.01); *H02K 2201/12* (2013.01)

(58) Field of Classification Search

CPC .......... H02K 1/02; H02K 11/04; H02K 11/21; H02K 11/33; H02K 2201/12
See application file for complete search history.

(56) References Cited

U.S. PATENT DOCUMENTS

2013/0162061 A1* 6/2013 Yang .................... H02K 19/103 310/43
2021/0323600 A1* 10/2021 Nakano .................... H02K 5/10
2022/0416614 A1* 12/2022 Hara ...................... H02K 11/33

* cited by examiner

*Primary Examiner* — Naishadh N Desai
(74) *Attorney, Agent, or Firm* — The Rapacke Group, P.A.

(57) ABSTRACT

An electric motor-generator can include a stator; at least two coils, wherein each coil is wrapped around a respective portion of the stator; a rotor mounted on a shaft and positioned in the stator, the rotor including: a plurality of rotor segments, wherein for each rotor segment: a first portion is mounted on the shaft, the second and third portions are connected to the first portion and extend in an outward radial direction toward the stator; electrical conductors extending along inner surfaces of the stator in a direction parallel to a longitudinal axis of the stator; a rotary position sensor operably coupled to the shaft; and a controller in communication with the rotary position sensor and configured at least to: determine rotational positions of the shaft based on sensor data from the rotary position sensor; drive currents through the electrical conductors based on the rotational positions of the shaft.

20 Claims, 10 Drawing Sheets

ELECTRIC MOTOR-GENERATOR

TECHNICAL FIELD

The embodiments generally relate to the field of motor-generators.

BACKGROUND

Electric motor-generators typically include permanent magnets.

There is a need for an electric-motor generator that does not require permanent magnets.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the disclosed electric motor-generator can include a stator; at least two coils, wherein each coil is wrapped around a respective portion of the stator; a rotor mounted on a shaft and positioned in the stator, the rotor including: a plurality of rotor segments, wherein for each rotor segment: a first portion is mounted on the shaft, the second and third portions are connected to the first portion and extend in an outward radial direction toward the stator; electrical conductors extending along inner surfaces of the stator in a direction parallel to a longitudinal axis of the stator; a rotary position sensor operably coupled to the shaft; and a controller in communication with the rotary position sensor and configured at least to: determine rotational positions of the shaft based on sensor data from the rotary position sensor; drive currents through the electrical conductors based on the rotational positions of the shaft.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

Figure 1:
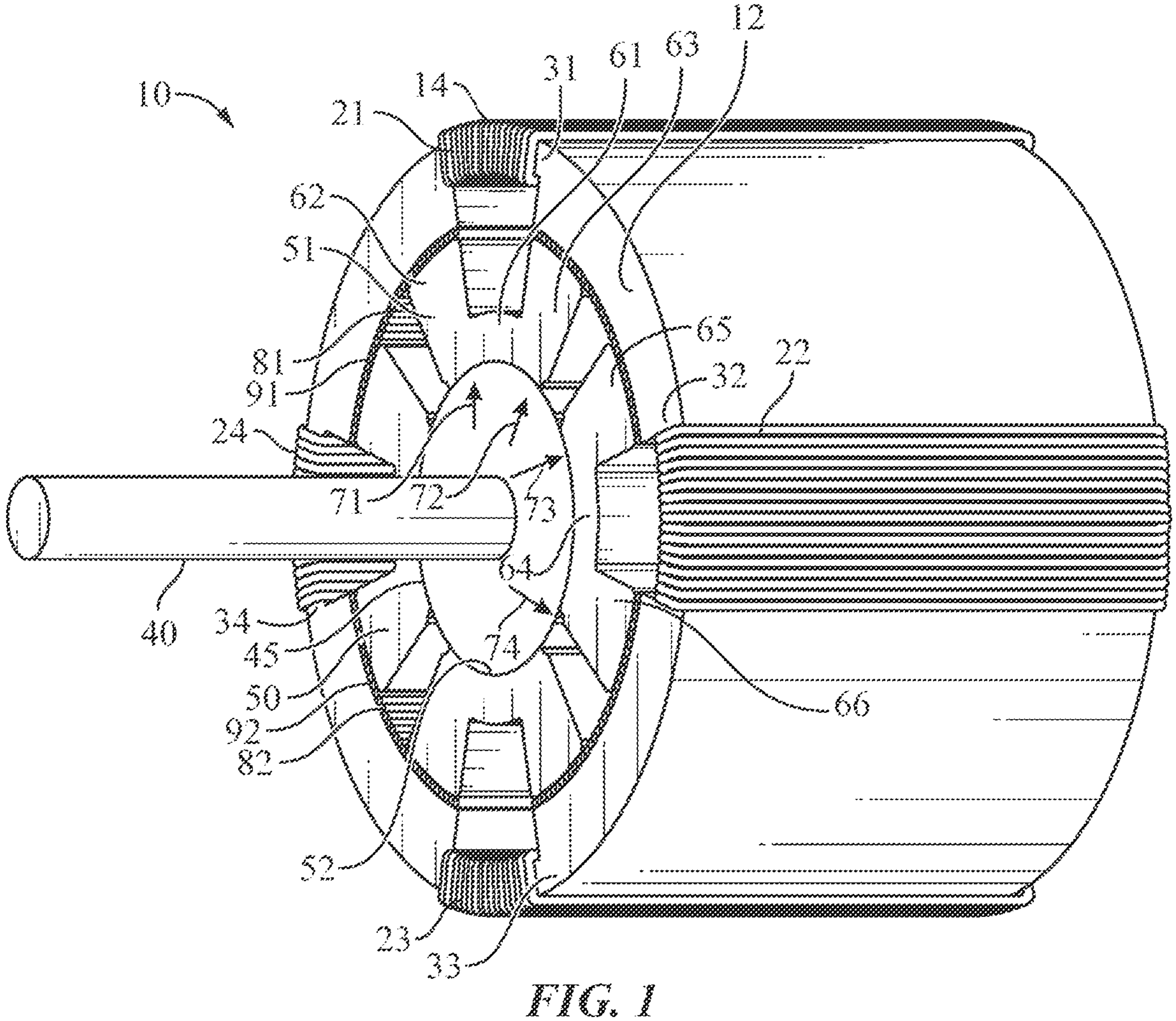
FIG. 1 illustrates an electric motor-generator, according to some embodiments disclosed herein.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described product or methods of use. Any specific details of the embodiments are used for demonstration purposes only and no unnecessary limitations or inferences are to be understood from there.

It is noted that the embodiments reside primarily in combinations of components and procedures related to the products. Accordingly, the product and components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to an electric motor-generator that can include a stator, a shaft, and a rotor positioned within the stator and mounted on the shaft. The rotor can include a plurality of rotor segments, wherein each rotor segment includes a first portion, a second portion, and a third portion, wherein: the first portion is mounted on the shaft, and the second and third portions are connected to the first portion and extend in an outward radial direction toward the stator. In some embodiments, each rotor segment can be U-shaped.

The electric motor-generator can include at least two coils, wherein each coil is wrapped around a respective portion of the stator. Pluralities of electrical conductors can extend along inner surfaces of the stator in a direction parallel to a longitudinal axis of the stator.

A rotary position sensor is operably coupled to the shaft. A controller can be in operative communication with the rotary position sensor and configured at least to: determine rotational positions of the shaft based on sensor data from the rotary position sensor, and drive currents through the electrical conductors based on the rotational positions of the shaft.

In some embodiments, the rotor can be made primarily of iron. In some embodiments, the stator can be made primarily of iron. In some embodiments, the rotor can be magnetically permeable so that the rotor is magnetizable. In some embodiments, the stator can be magnetically permeable so that the stator is magnetizable.

In some embodiments, any of the pluralities of electrical conductors can be made primarily of copper, aluminum, gold, silver, or any combination thereof. In some embodiments, any coil can be electrically conductive, and made primarily of copper, aluminum, gold, silver, or any combination thereof.

Referring to FIG. 1, an electric motor-generator 10 can include a stator 12. In some embodiments, the electric motor-generator 10 can include a shaft 40. In some embodiments, the electric motor-generator 10 can include a rotor 50 mounted on the shaft 40 and positioned in the stator 12. In some embodiments, the rotor 50 can include a rotor core portion 45 that is wider than the shaft 40, wherein the rotor core portion 45 is mounted on the shaft 40. In some embodiments, the rotor core portion 45 can be mounted on the shaft 40 so that the shaft 40 rotates with the rotor core portion 45. For example, in some embodiments, the rotor core portion 45 can be integrally formed with the shaft 40. As another example, the shaft 40 can be fastened to the rotor core portion 45 so that the shaft 40 is rotationally locked to the rotor core portion 45.

In some embodiments, the rotor 50 can include a first rotor segment 51 having a first portion 61, a second portion 62, and a third portion 63. In some embodiments, the first rotor segment 51 can be U-shaped. For example, the first portion 61 of the first rotor segment 51 can be mounted on the shaft 40. The second portion 62 of the first rotor segment 51 can be connected to the first portion 61 of the first rotor segment 51 and extend in a first outward radial direction 71 toward the stator 12. The third portion 63 of the first rotor segment 51 can be connected to the first portion 61 of the first rotor segment 51 and extend in a second outward radial direction 72 toward the stator 12. In some embodiments, the first portion 61, the second portion 62, and the third portion 63 can be mounted on the rotor core portion 45.

In some embodiments, the rotor 50 can include a second rotor segment 52 having a fourth portion 64, a fifth portion 65, and a sixth portion 66. In some embodiments, the second rotor segment 52 can be U-shaped. For example, the fourth portion 64 of the second rotor segment 52 can be mounted on the shaft 40. The fifth portion 65 of the second rotor segment 52 can be connected to the fourth portion 64 and extend in a third outward radial direction 73 toward the stator 12. The sixth portion 66 can be connected to the fourth portion 64 and extend in a fourth outward radial direction 74 toward the stator 12. In some embodiments, the fourth portion 64, the fifth portion 65, and the sixth portion 66 can be mounted on the rotor core portion 45.

Figure 2:
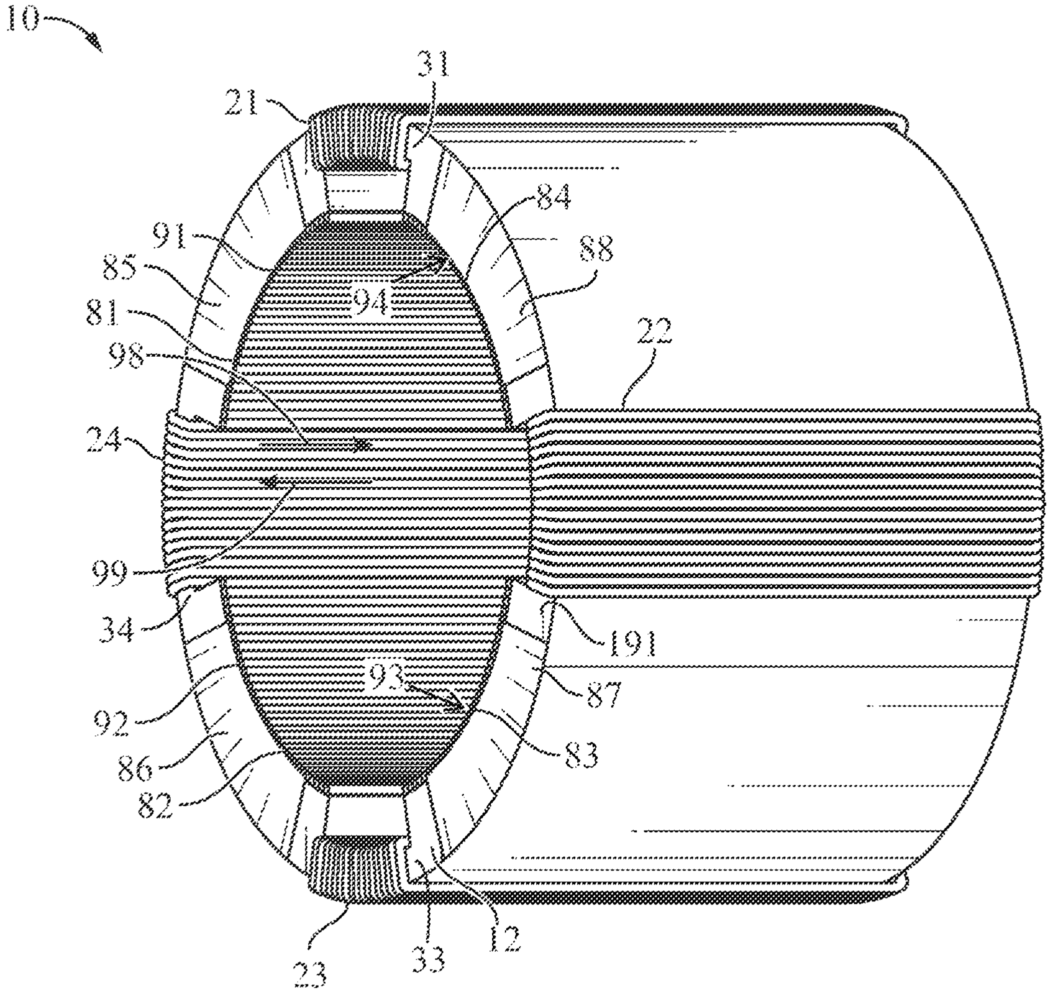
FIG. 2 illustrates an electric motor-generator with the rotor and shaft omitted, according to some embodiments disclosed herein.

Referring to FIG. 2, in some embodiments, the electric motor-generator 10 can include at least two coils 14, including a first coil 21 wrapped around a first portion 31 of the stator 12. In some embodiments, the at least two coils 14 can include a second coil 22 wrapped around a second portion 32 of the stator. In some embodiments, the at least two coils 14 can include a third coil 23 wrapped around a third portion 33 of the stator 12. In some embodiments, the at least two coils 14 can include a fourth coil 24 wrapped around a fourth portion 34 of the stator 12. In some embodiments, the at least two coils 14 can include any additional coils wrapped around respective portions of the stator 12.

In some embodiments, the electric motor-generator 10 can include a first plurality of electrical conductors 81 extending along a first inner surface 91 of the stator 12 in a first direction 98 parallel to a longitudinal axis 99 of the stator 12. In some embodiments, the first plurality of electrical conductors 81 can be positioned between the first coil 21 and the second coil 22.

In some embodiments, the electric motor-generator 10 can include a second plurality of electrical conductors 82 extending along a second inner surface 92 of the stator 12 in the first direction 98. In some embodiments, the second plurality of electrical conductors 82 can be positioned between the first coil 21 and the second coil 22.

In some embodiments, the electric motor generator 10 can include any additional pluralities of electrical conductors, such as a third plurality of electrical conductors 83 and a fourth plurality of electrical conductors extending along respective inner surfaces 93, 94 of the stator 12 in the first direction 98. In some embodiments, respective metal clamps 85, 86, 87, 88 can clamp the pluralities of electrical conductors 81, 82, 83, 84 to the stator 12.

Figure 3:
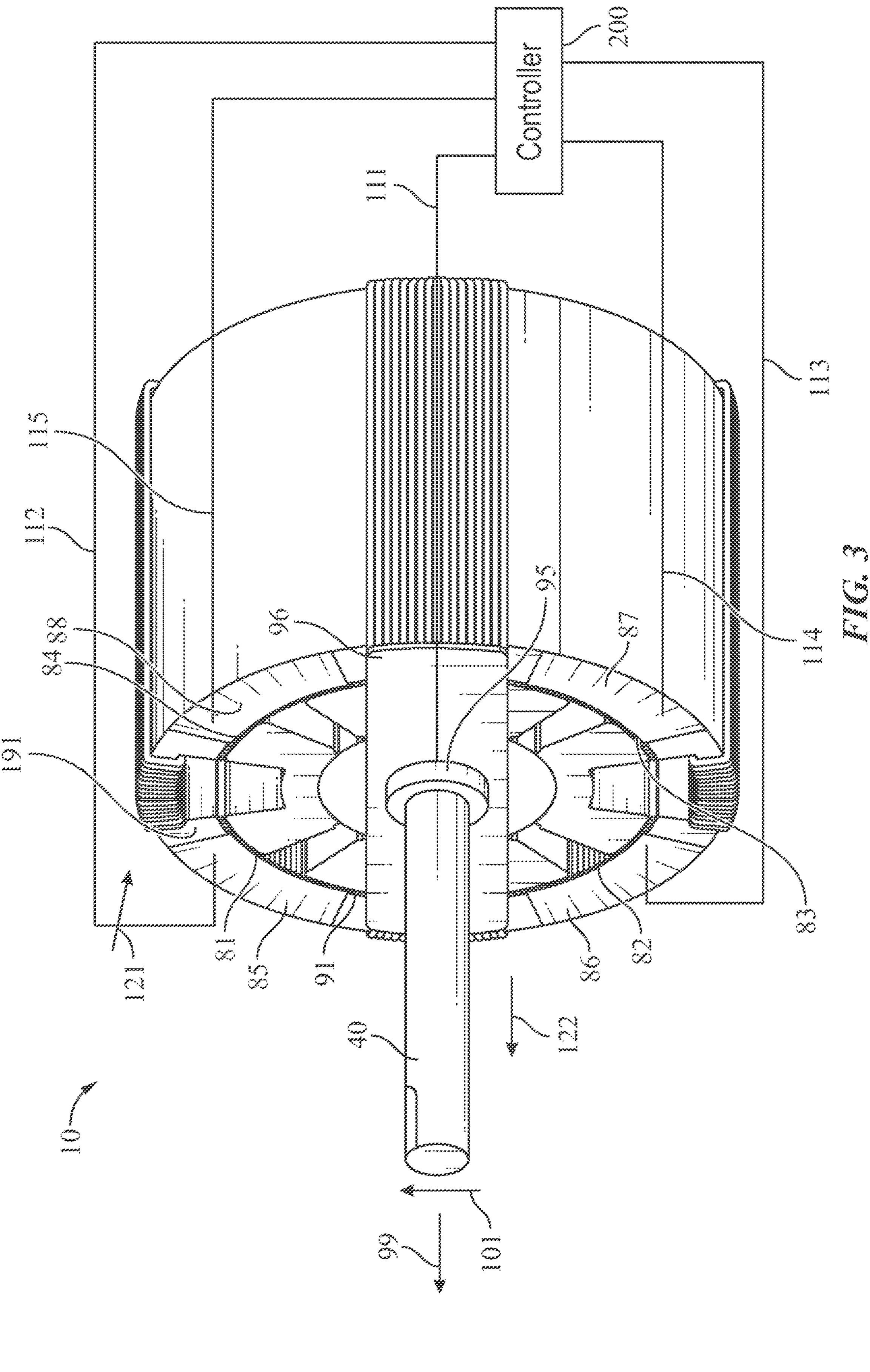
FIG. 3 illustrates an electric motor-generator with a rotary position sensor and with a shaft at a first rotational position, according to some embodiments disclosed herein.

Referring to FIG. 3, in some embodiments, the electric motor-generator 10 can include a rotary position sensor 95 operably coupled to the shaft 40. The rotary position sensor 95 can be any sensor that is configured to output sensor data that indicates a rotational position of the shaft 40. In some embodiments, the rotary position sensor 95 can be a potentiometer, a rotary encoder, a magnetic sensor (e.g., a Hall effect sensor), or any other suitable sensor for outputting sensor data that indicates a rotational position of the shaft 40. In some embodiments, the rotary position sensor 95 can include a sensor housing 96 attached to the stator 12.

In some embodiments, the electric motor-generator 10 can include a controller 200 in communication with the rotary position sensor 95. The rotary position sensor 95 can send any sensor data that indicates the rotational position of the shaft 40 to the controller 200. In some embodiments, the controller 200 can be connected to the rotary position sensor 95 via one or more electrical connections 111.

In some embodiments, the controller 200 can be electrically connected to the first plurality of electrical conductors 81, the second plurality of electrical conductors 82, the third plurality of electrical conductors 83, the fourth plurality of electrical conductors 84, or any combination thereof. In some embodiments, the controller 200 can be electrically connected to first ends of the first plurality of electrical conductors 81, first ends of the second plurality of electrical conductors 82, first ends of the third plurality of electrical conductors 83, first ends of the fourth plurality of electrical conductors 84 by electrical connections 112, 113, 114, 115 and respective metal clamps 85, 86, 87, 88 at a first side 191 of the stator 12.

In some embodiments, the controller 200 can drive currents through the pluralities of electrical conductors 81, 82, 83, 84 based on sensor data from the rotary position sensor 95. For example, in some embodiments, the controller 200 can determine a first rotational position 101 of the shaft 40 based on first sensor data from the rotary position sensor 95. In some embodiments, the controller 200 can drive a first current through at least the first plurality of electrical conductors 81 and the third plurality of electrical conductors 83 based on the first rotational position 101 of the shaft 40. In some embodiments, while driving the first current through at least the first plurality of electrical conductors 81 and the third plurality of electrical conductors 83, the controller 200 can drive a second current through at least the second plurality of electrical conductors 82 and the fourth plurality of electrical conductors 84 based on the first rotational position 101 of the shaft 40. In some embodiments, the first current and the second current are direct currents (i.e., not alternating currents). In some embodiments, a direction 121 of the first current can be opposite a direction 122 of the second current.

Figure 4:
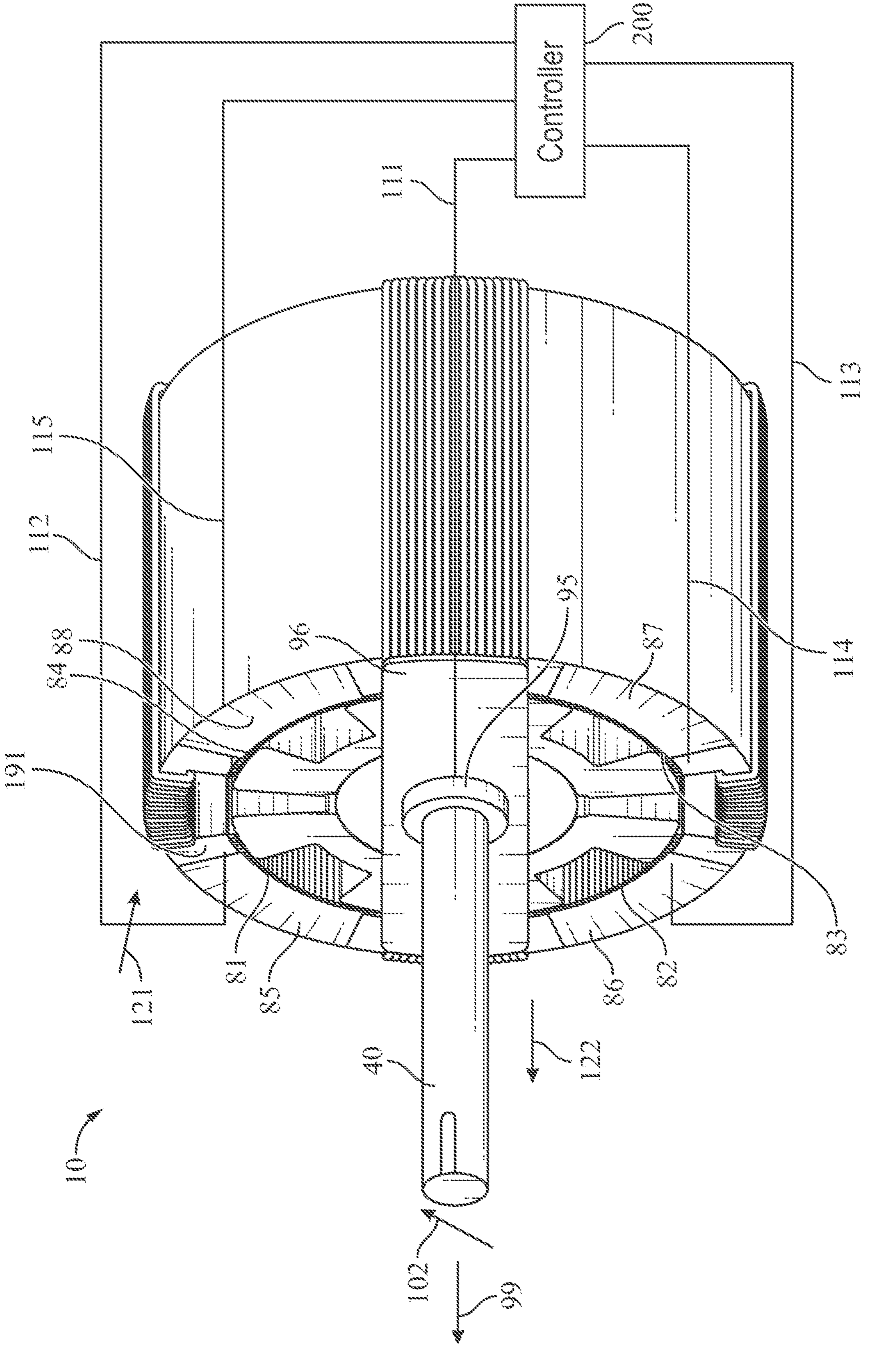
FIG. 4 illustrates an electric motor-generator with a rotary position sensor and with a shaft at a second rotational position, according to some embodiments disclosed herein.

Referring to FIG. 4, in some embodiments, the controller 200 can determine a second rotational position 102 of the shaft 40 based on second sensor data from the rotary position sensor 95. In some embodiments, the controller 200 can drive the second current through at least the first plurality of electrical conductors 81 and the third plurality of electrical conductors 83 based on the second rotational position 102 of the shaft 40. In some embodiments, while driving the second current through at least the first plurality of electrical conductors 81 and the third plurality of electrical conductors 83, the controller 200 can drive the first current through at least the second plurality of electrical conductors 82 and the fourth plurality of electrical conductors 84 based on the second rotational position 102 of the shaft.

Figure 5:
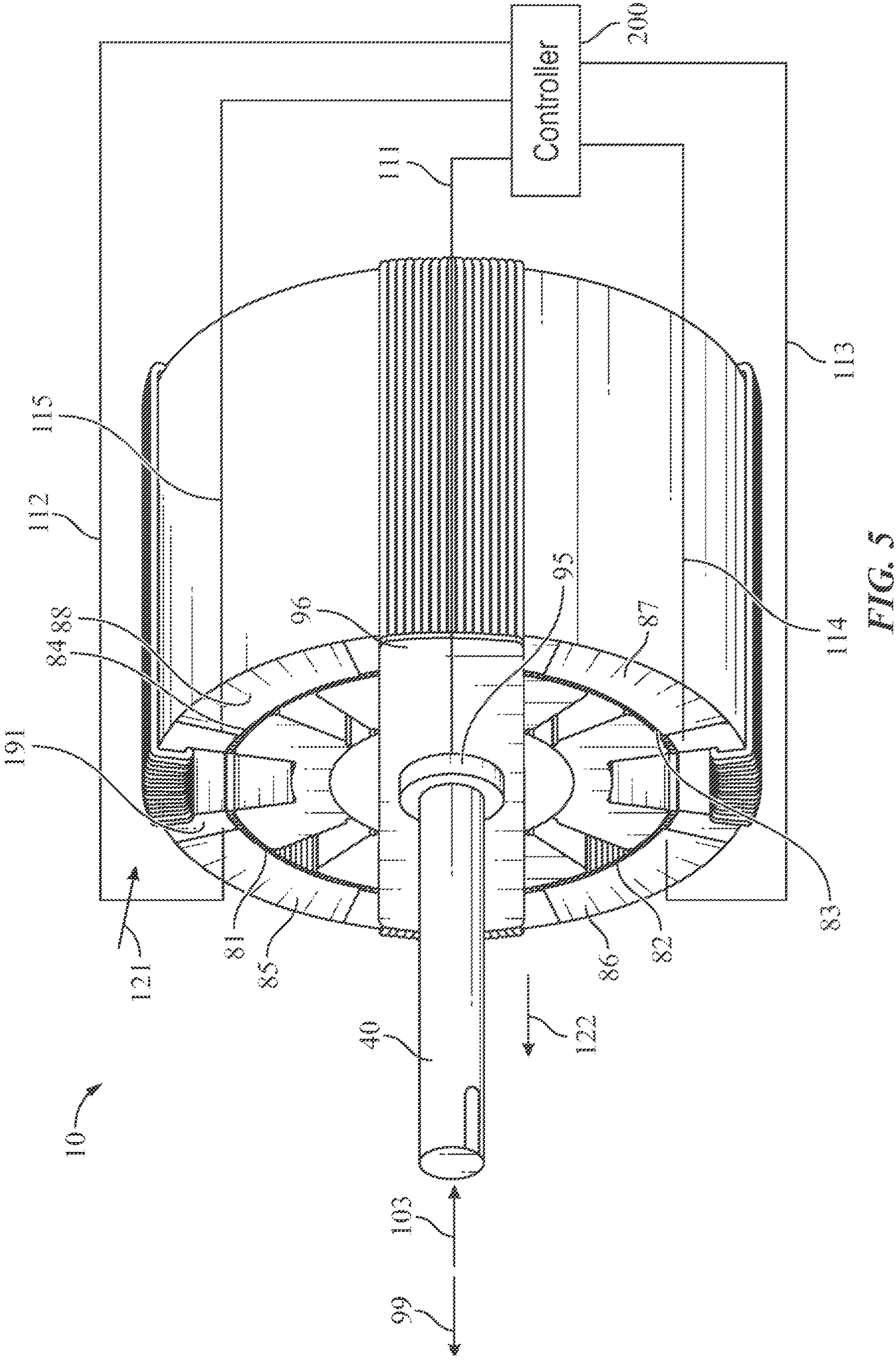
FIG. 5 illustrates an electric motor-generator with a rotary position sensor and with a shaft at a third rotational position, according to some embodiments disclosed herein.

Referring to FIG. 5, in some embodiments, the controller 200 can determine a third rotational position 103 of the shaft 40 based on third sensor data from the rotary position sensor 95. In some embodiments, the controller 200 can drive the first current through at least the first plurality of electrical conductors 81 and the third plurality of electrical conductors 83 based on the third rotational position 103 of the shaft 40. In some embodiments, while driving the first current through at least the first plurality of electrical conductors 81 and the third plurality of electrical conductors 83, the controller 200 can drive the second current through at least the second plurality of electrical conductors 82 and the fourth plurality of electrical conductors 84 based on the third rotational position 103 of the shaft 40.

Figure 6:
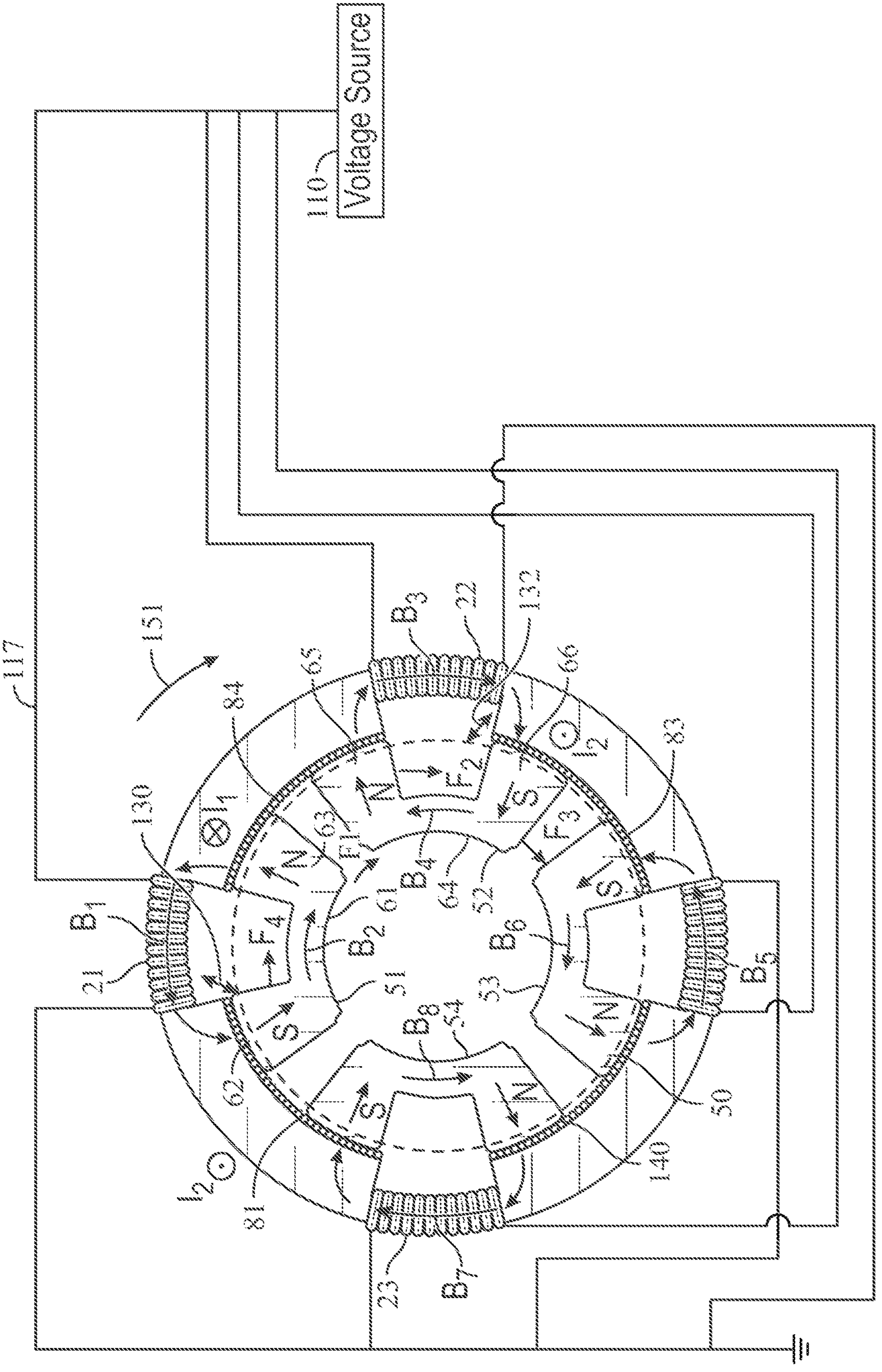
FIG. 6 illustrates an electric motor-generator with magnetic fields and currents shown during operation, according to some embodiments disclosed herein.

Referring to FIG. 6, in some embodiments, the electric motor-generator 10 can include at least one voltage source 110 electrically connected to the first coil 21 to generate a first magnetic field $B_1$ that, when the first rotor segment 51 is positioned within a first distance 130 from the first coil 21, induces a second magnetic field $B_2$ in the first rotor segment 51 so that the second portion 62 of the first rotor segment 51 has a first magnetic polarity (e.g., south polarity) and the third portion 63 of the first rotor segment 51 has a second magnetic polarity (e.g., north polarity) opposite the first magnetic polarity.

In some embodiments, the at least one voltage source 110 can be electrically connected to the second coil 22 to generate a third magnetic field $B_3$ that, when the second rotor segment 52 is positioned within a second distance 132 from the second coil 22, induces a fourth magnetic field $B_4$ in the second rotor segment 52 so that the fifth portion 65 of the second rotor segment 52 has the second magnetic polarity (e.g., north polarity) and the sixth portion 66 of the second rotor segment 52 has the first magnetic polarity (e.g., south polarity).

Similarly, in some embodiments, the at least one voltage source 110 can be electrically connected to the third coil 23, the fourth coil 24, any additional coil(s), or any combination thereof, for inducing magnetic fields in rotor segments of the rotor 50. In some embodiments, magnetic fields (e.g., $B_1$, $B_3$, $B_5$, $B_7$) can induce magnetic fields $B_2$, $B_4$, $B_6$, and $B_8$ in the rotor segments 51, 52, 53, 54 so that portions (e.g., 62, 63, 65, 66) of the rotor segments 51, 52, 53, 54 along a circumference 140 of the rotor 50 have alternating magnetic polarities.

Currents can be driven through the pluralities of electrical conductors 81, 82, 83, 84 to generate Lorentz forces that rotate the rotor 50. In general, a Lorentz force is proportional to a cross product between a current and a magnetic field.

In some embodiments, a first current $I_1$ can be driven through the fourth plurality of electrical conductors 84. The first current $I_1$ can have a first direction (e.g., 121 in FIG. 4). When the third portion 63 of the first rotor segment 51 is aligned with the fourth plurality of electrical conductors 84, the first current $I_1$ can apply a force $F_1$ on the third portion 63 of the first rotor segment 51 having a second magnetic polarity, causing the rotor 50 to rotate in a first rotational direction 151 (e.g., clockwise). While the current $I_1$ applies the force $F_1$ on the third portion 63, and when the fifth portion 65 of the second rotor segment 52 is aligned with the fourth plurality of electrical conductors 84, the first current $I_1$ can apply a force $F_2$ on the fifth portion 65 of the second rotor segment 52 having the second magnetic polarity, causing the rotor 50 to rotate in the first rotational direction 151 (e.g., clockwise).

In some embodiments, a second current $I_2$ can be driven through the third plurality of electrical conductors 83. The second current $I_2$ can have a second direction (e.g., 122 in FIG. 4). While the first current $I_1$ applies the force $F_2$ on the fifth portion 65 of the second rotor segment 52, and when the sixth portion 66 of the second rotor segment 52 is aligned with the third plurality of electrical conductors 83, the second current $I_2$ can apply a force $F_3$ on the sixth portion 66 of the second rotor segment 52 having the first magnetic polarity, causing the rotor 50 to rotate in the first rotational direction 151 (e.g., clockwise).

In some embodiments, the second current $I_2$ can be driven through the first plurality of electrical conductors 81. While the current $I_1$ applies the force $F_1$ on the third portion 63, and when the second portion 62 of the first rotor segment 51 is aligned with the first plurality of electrical conductors 81, the second current $I_2$ can apply a force $F_4$ on the second portion 62 of the first rotor segment 51 having the first magnetic polarity, causing the rotor 50 to rotate in the first rotational direction 151 (e.g., clockwise direction).

Figure 7:
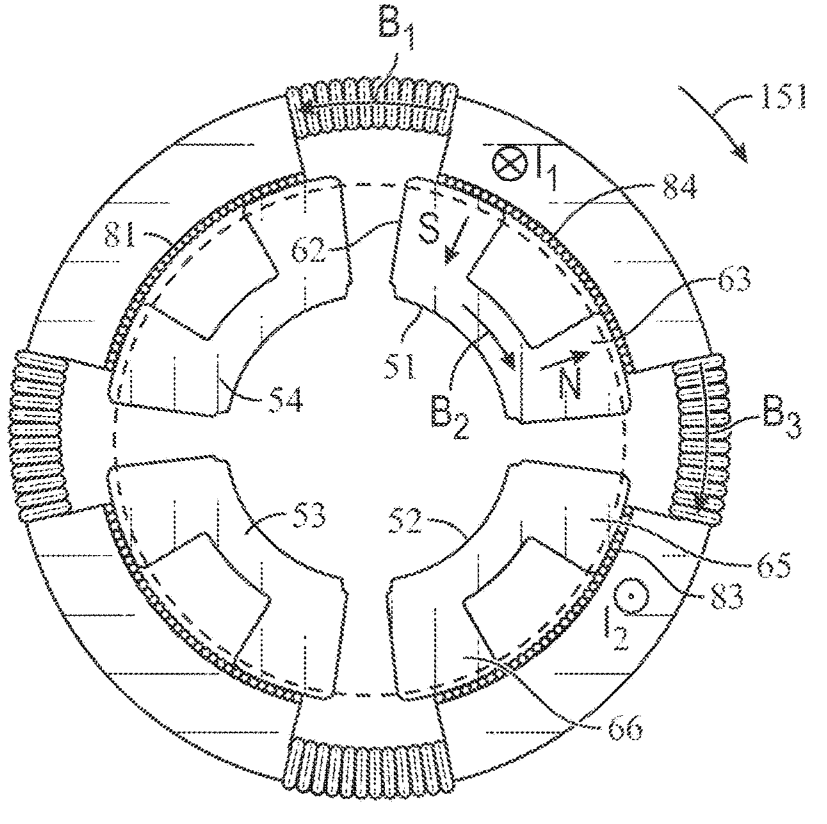
FIG. 7 illustrates an electric motor-generator with magnetic fields and currents shown during operation, according to some embodiments disclosed herein.
Figure 8:
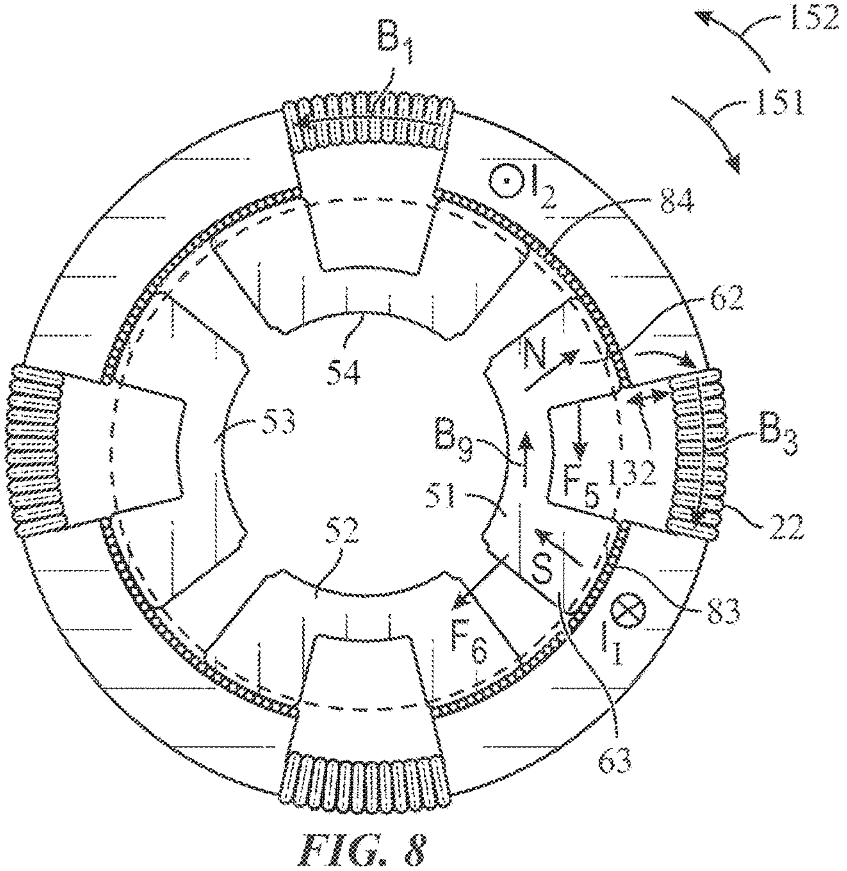
FIG. 8 illustrates an electric motor-generator with magnetic fields and currents shown during operation, according to some embodiments disclosed herein.

Referring to FIG. 7, the rotor 12 has rotated in the first rotational direction 151. Referring to FIG. 8, the rotor 12 has further rotated in the first rotational direction 151 so that the first rotor segment 51 is within a second distance 132 from the second coil 22. When the first rotor segment 51 is positioned within the second distance 132 from the second coil 22, a magnetic field $B_9$ is induced in the first rotor segment 51 by the third magnetic field $B_3$ so that the second portion 62 of the first rotor segment 51 has the second magnetic polarity and the third portion 63 of the first rotor segment 51 has the first magnetic polarity opposite the second magnetic polarity.

In some embodiments, the controller (e.g., 200 in FIG. 4) can periodically reverse the direction of current in each of the pluralities of electrical conductors 81, 82, 83, 84 to prevent the rotor 12 from being rotated in the second rotational direction 152 opposite the first rotational direction 151. For example, the controller can drive the second current $I_2$ through the fourth plurality of electrical conductors 84 and drive the first current $I_1$ through the third plurality of electrical conductors 83.

When the second portion 62 of the first rotor segment 51 is aligned with the fourth plurality of electrical conductors 84 the second current $I_2$ through the fourth plurality of electrical conductors 84 can apply a force $F_5$ on the second portion 62 of the first rotor segment 51 having the second magnetic polarity, causing the rotor 50 to rotate in the first rotational direction 151 (e.g., clockwise). When the third portion 63 of the first rotor segment 51 is aligned with the third plurality of electrical conductors 83, the first current $I_1$ through the third plurality of electrical conductors 83 can apply a force $F_6$ on the third portion 63 of the first rotor segment 51 having the first magnetic polarity, causing the rotor 50 to rotate in the first rotational direction 151 (e.g., clockwise).

Figure 9:
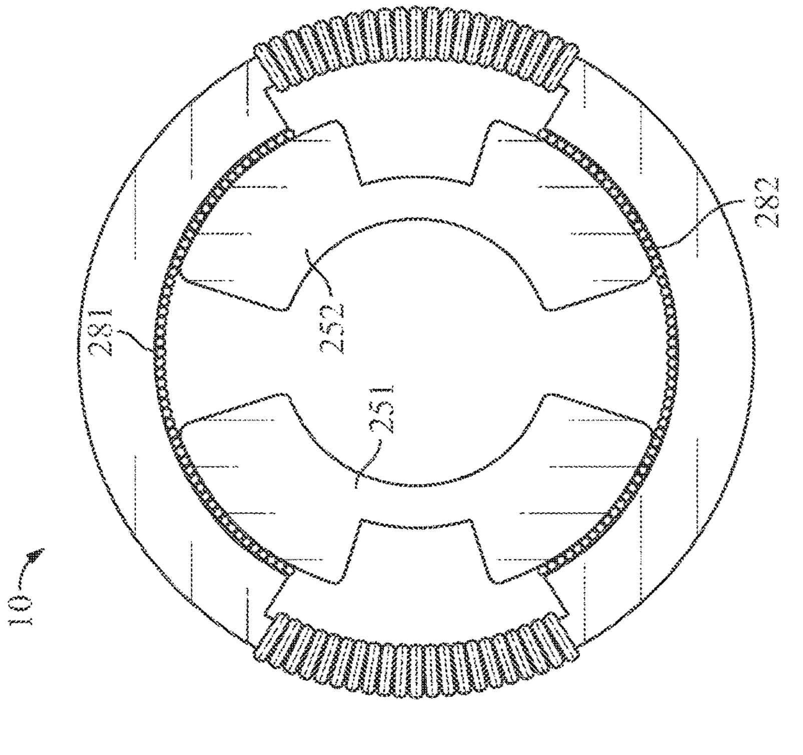
FIG. 9 illustrates an electric motor-generator with two pluralities of electrical conductors, two rotor segments, and two coils, according to some embodiments disclosed herein.

In some embodiments, the electric motor-generator 10 can include any suitable number of pluralities of electrical conductors (e.g., one plurality, two pluralities, three pluralities, etc.). In some embodiments, the electric motor-generator 10 can include any suitable number of rotor segments (e.g., one rotor segment, two rotor segments, three rotor segments, etc.). In some embodiments, the electric motor-generator 10 can include any suitable number of coils (e.g., one coil, two coils, three coils, etc.). For example, referring to FIG. 9, the electric motor-generator 10 can include two pluralities of electrical conductors 281, 282, two rotor segments 251, 252, and two coils 221, 222.

Figure 10:
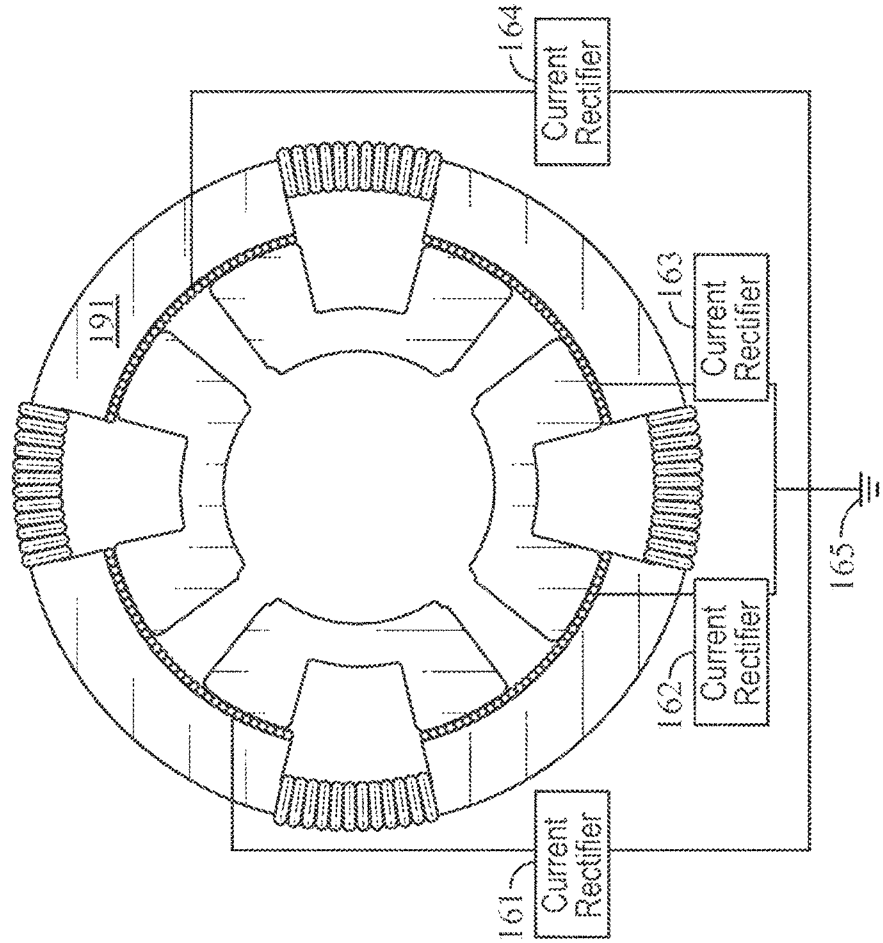
FIG. 10 illustrates an electric motor-generator with current rectifiers, according to some embodiments disclosed herein.

In some embodiments, the electric motor-generator 10 can be operated as an electric motor and as a generator. For example, when the electric motor-generator 10 is operated as a generator, and while the coils are electrically connected to at least one voltage source (e.g., 110 in FIG. 6) to generate magnetic fields (e.g., $B_1$, $B_3$, $B_5$, $B_7$ in FIG. 6), the rotor 50 can be rotated (e.g., mechanically) to generate currents through the pluralities of electrical conductors 81, 82, 83, 84. Referring to FIG. 10, to ensure that the generated currents through the pluralities of electrical conductors 81, 82, 83, 84 flow in a single direction, one or more current rectifiers 161, 162, 163, 164 can be electrically connected to the pluralities of electrical conductors 81, 82, 83, 84. The one or more current rectifiers 161, 162, 163, 164 can be electrically connected to a common output node 165 to combine the generated currents from the pluralities of electrical conductors 81, 82, 83, 84.

Figure 11:
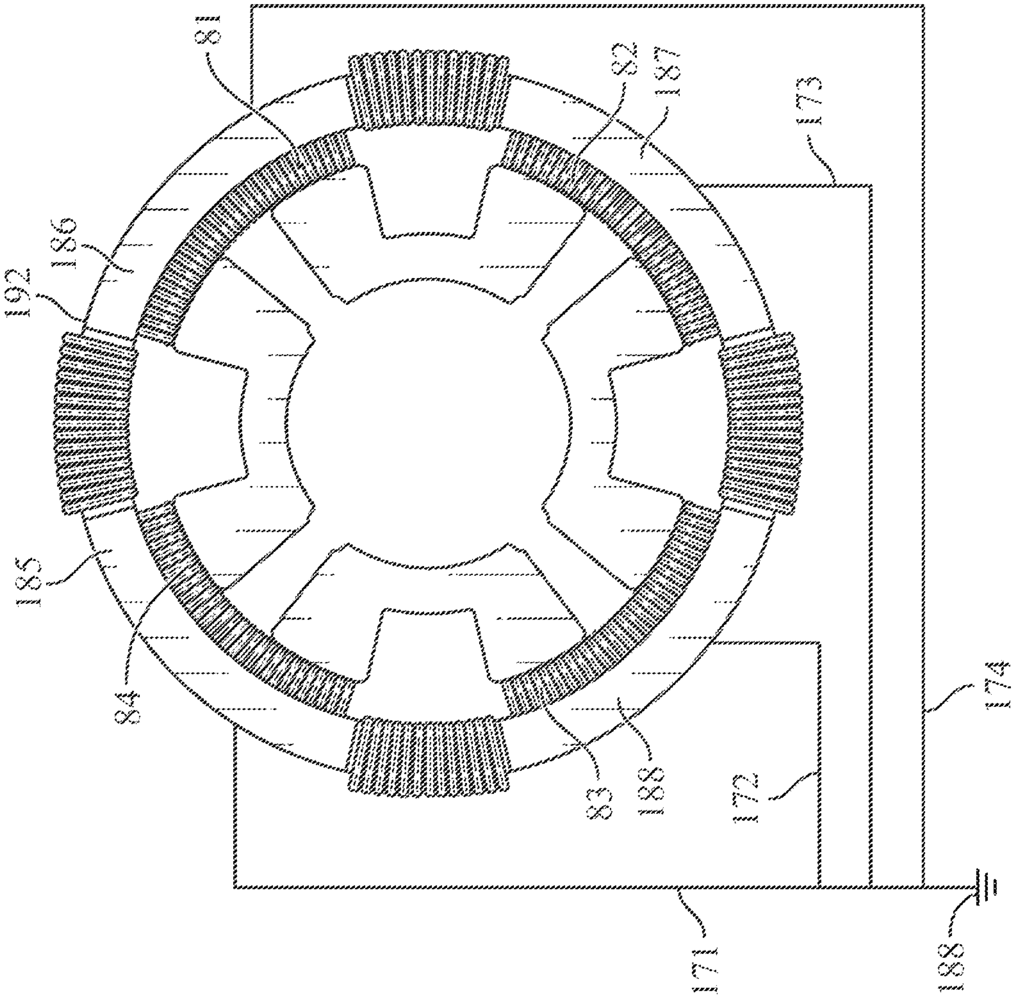
FIG. 11 illustrates an electric motor-generator with electrical conductors connected to a ground voltage node, according to some embodiments disclosed herein.

When the electric motor-generator 10 is operated as an electric motor, the controller 200 can be electrically connected to the pluralities of electrical conductors 81, 82, 83, 84 at the first side 191 of the stator 12 as in FIG. 5 to control the currents through the pluralities of electrical conductors 81, 82, 83, 84. Referring to FIG. 11, second ends of the pluralities of electrical conductors 81, 82, 83, 84 can be clamped by metal clamps 185, 186, 187, 188 at a second side 192 opposite the first side 191 of the stator 12. The second ends of the pluralities of electrical conductors 81, 82, 83, 84 can be electrically connected to a ground voltage node 188 by electrical connections 171, 172, 173, 174 and the metal clamps 185, 186, 187, 188.

Figure 12:
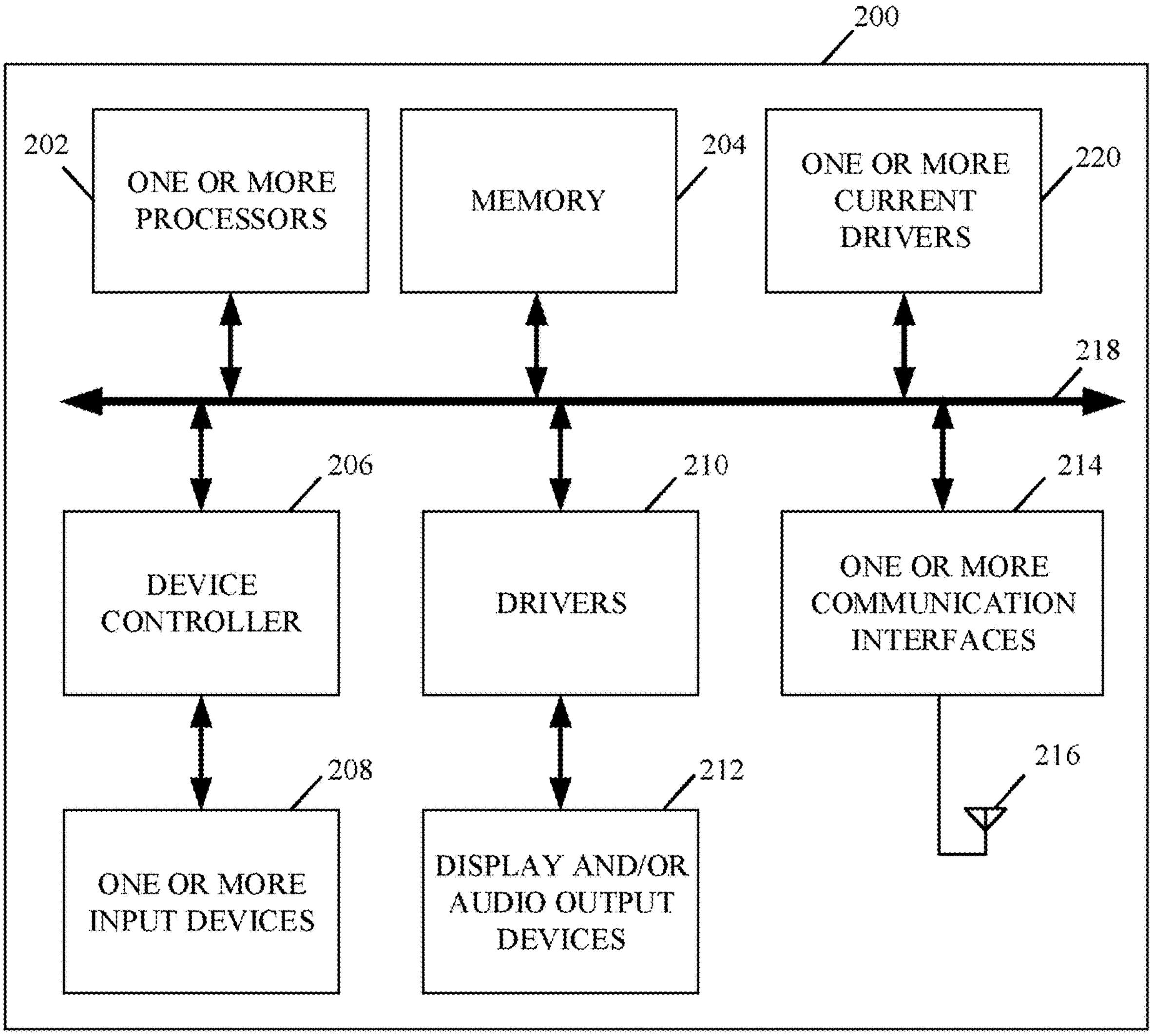
FIG. 12 illustrates a block diagram of hardware for a controller, according to some embodiments disclosed herein.

Referring to FIG. 12, an example hardware of a controller 200 is illustrated. In some embodiments, the controller 200 can include one or more processors 202, memory 204, and one or more current drivers 220. In some embodiments, the controller 200 can further include a device controller 206, one or more input devices 208, display and/or audio drivers 210, display and/or audio output devices 212, one or more communication interfaces 214, a bus 218, one or more antennas 216, or any combination thereof.

In some embodiments, the one or more processors 202 can include any suitable hardware processor, such as a central processing unit (CPU), a graphics processing unit (GPU), a tensor processing unit (TPU), an accelerated processing unit (APU), any other type of processing unit, or any combination thereof. In some embodiments, the one or more processors 202 can include a microprocessor, a controller, a micro-controller, a digital signal processor, dedicated logic, an application-specific integrated circuit (ASIC), a field programmable gate array (FPGA), an accelerator (e.g., an artificial intelligence (AI) accelerator or a cryptographic accelerator), any other suitable circuitry for controlling the functioning of a general purpose computer or a special purpose computer, or any combination thereof.

In some embodiments, one or more processors 202 can be in operative communication with at least the memory 204 and the one or more current drivers 220. The one or more processors 202 can be configured to send commands to the one or more current drivers 220 to drive respective currents through the pluralities of electrical conductors 81, 82, 83, 84 based on sensor data from the rotary position sensor 95.

In some embodiments, the memory 204 can include any suitable memory, storage, or a combination thereof for storing programs, data, and/or any other suitable information. For example, memory 204 can include volatile memory, non-volatile memory, or any combination thereof. In some embodiments, memory 204 can include random access memory, read-only memory, flash memory, a hard disk drive, a solid state drive, optical media, any other suitable memory, or any combination thereof.

In some embodiments, the device controller 206 can include any suitable processor or circuitry for controlling and receiving any input from the one or more input devices 208. In some embodiments, the one or more input devices 208 can include a touchscreen, a keyboard, a mouse, one or more buttons, a voice recognition circuit, one or more cameras, one or more sensors, any other suitable input device, or any combination thereof. In some embodiments, the one or more sensors can include the rotary position sensor 95, one or more microphones, any other suitable sensors (e.g., an optical sensor, a temperature sensor, a near field sensor), or any combination thereof.

In some embodiments, the display and/or audio drivers 210 can include any suitable circuitry for controlling and driving output to one or more display and/or audio output devices 212. For example, the output devices can include a display (e.g., including a touchscreen, a flat-panel display, a cathode ray tube display, a projector, any other suitable display or presentation device, or any combination thereof), one or more speakers, or a combination thereof.

In some embodiments, the one or more communication interfaces 214 can include any suitable circuitry for interfacing with one or more communication networks and/or another computing device. For example, the one or more communication interfaces 214 can include network interface card circuitry, wired communication circuitry, wireless communication circuitry, any other suitable communication network circuitry, or any combination thereof. In some embodiments, the one or more communication interfaces 214 can include an antenna driver configured to drive the one or more antennas 216. In some embodiments, the one or more communication interfaces 214 can include a WI-FI® communication interface, a BLUETOOTH® communication interface, any other suitable communication interface, or any combination thereof.

In some embodiments, the one or more antennas 216 can wirelessly communicate with a communication network and/or another computing device. In some embodiments, the one or more antennas 216 can include a transmitting antenna, a receiving antenna, a transmitting and receiving antenna, or any combination thereof. In some embodiments, the one or more antennas 216 can include a WI-FI® antenna, a BLUETOOTH® antenna, any other suitable antenna, or any combination thereof. In some embodiments, the one or more antennas 216 can be omitted.

In some embodiments, the bus 218 can include any suitable communication system for communicating data, addresses, control signals, power, or any combination thereof, between two or more components 202, 204, 206,

210, 214, and 220. In some embodiments, the bus 218 can include any suitable conductors that are constructed and arranged to communicate data, addresses, control signals, power, or any combination thereof, between two or more components 202, 204, 206, 210, 214, 220.

In some embodiments, any other suitable component(s) can be included in the controller 200.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, an electric motor-generator can include a stator; at least two coils, including: a first coil wrapped around a first portion of the stator; and a second coil wrapped around a second portion of the stator; a shaft; a rotor mounted on the shaft and positioned in the stator, the rotor including: a first rotor segment having a first portion, a second portion, and a third portion, wherein: the first portion is mounted on the shaft; the second portion is connected to the first portion and extends in a first outward radial direction toward the stator; the third portion is connected to the first portion and extends in a second outward radial direction toward the stator; a second rotor segment having a fourth portion, a fifth portion, and a sixth portion, wherein: the fourth portion is mounted on the shaft; the fifth portion is connected to the fourth portion and extends in a third outward radial direction toward the stator; the sixth portion is connected to the fourth portion and extends in a fourth outward radial direction toward the stator; a first plurality of electrical conductors extending along a first inner surface of the stator in a first direction parallel to a longitudinal axis of the stator, the first plurality of electrical conductors being positioned between the first coil and the second coil; a second plurality of electrical conductors extending along a second inner surface of the stator in the first direction, the second plurality of electrical conductors being positioned between the first coil and the second coil; a rotary position sensor operably coupled to the shaft; and a controller in communication with the rotary position sensor and configured at least to: determine a first rotational position of the shaft based on first sensor data from the rotary position sensor; drive a first current through at least the first plurality of electrical conductors based on the first rotational position of the shaft; while driving the first current through at least the first plurality of electrical conductors, drive a second current through at least the second plurality of electrical conductors based on the first rotational position of the shaft; determine a second rotational position of the shaft based on second sensor data from the rotary position sensor; drive the second current through at least the first plurality of electrical conductors based on the second rotational position of the shaft; and while driving the second current through at least the first plurality of electrical conductors, drive the first current through at least the second plurality of electrical conductors based on the second rotational position of the shaft; wherein a direction of the first current is opposite a direction of the second current.

According to variation 2, an electric motor-generator can include a stator; at least two coils, including: a first coil wrapped around a first portion of the stator; and a second coil wrapped around a second portion of the stator; a shaft; a rotor mounted on the shaft and positioned in the stator, the rotor including: a first rotor segment having a first portion, a second portion, and a third portion, wherein: the first portion is mounted on the shaft; the second portion is connected to the first portion and extends in a first outward radial direction toward the stator; the third portion is connected to the first portion and extends in a second outward radial direction toward the stator; a second rotor segment having a fourth portion, a fifth portion, and a sixth portion, wherein: the fourth portion is mounted on the shaft; the fifth portion is connected to the fourth portion and extends in a third outward radial direction toward the stator; the sixth portion is connected to the fourth portion and extends in a fourth outward radial direction toward the stator; a first plurality of electrical conductors extending along a first inner surface of the stator in a first direction parallel to a longitudinal axis of the stator; a second plurality of electrical conductors extending along a second inner surface of the stator in the first direction; a rotary position sensor operably coupled to the shaft; and a controller in communication with the rotary position sensor and configured at least to: determine a first rotational position of the shaft based on first sensor data from the rotary position sensor; drive a first current through at least the first plurality of electrical conductors based on the first rotational position of the shaft; while driving the first current through at least the first plurality of electrical conductors, drive a second current through at least the second plurality of electrical conductors based on the first rotational position of the shaft; determine a second rotational position of the shaft based on second sensor data from the rotary position sensor; drive the second current through at least the first plurality of electrical conductors based on the second rotational position of the shaft; and while driving the second current through at least the first plurality of electrical conductors, drive the first current through at least the second plurality of electrical conductors based on the second rotational position of the shaft; wherein a direction of the first current is opposite a direction of the second current.

According to variation 3, an electric motor-generator can include a stator; at least two coils, including: a first coil wrapped around a first portion of the stator; and a second coil wrapped around a second portion of the stator; a shaft; a rotor mounted on the shaft and positioned in the stator, the rotor including: a first rotor segment having a first portion, a second portion, and a third portion, wherein: the first portion is mounted on the shaft; the second portion is connected to the first portion and extends in a first outward radial direction toward the stator; the third portion is connected to the first portion and extends in a second outward radial direction toward the stator; a second rotor segment having a fourth portion, a fifth portion, and a sixth portion, wherein: the fourth portion is mounted on the shaft; the fifth portion is connected to the fourth portion and extends in a third outward radial direction toward the stator; the sixth portion is connected to the fourth portion and extends in a fourth outward radial direction toward the stator; a first plurality of electrical conductors extending along a first inner surface of the stator in a first direction parallel to a longitudinal axis of the stator; a second plurality of electrical conductors extending along a second inner surface of the stator in the first direction; a rotary position sensor operably coupled to the shaft; and a controller in communication with the rotary position sensor and configured at least to: determine a first rotational position of the shaft based on first sensor data from the rotary position sensor; drive a first current through at least the first plurality of electrical conductors based on the first rotational position of the shaft;

drive a second current through at least the second plurality of electrical conductors based on the first rotational position of the shaft; determine a second rotational position of the shaft based on second sensor data from the rotary position sensor; drive the second current through at least the first plurality of electrical conductors based on the second rotational position of the shaft; and drive the first current through at least the second plurality of electrical conductors based on the second rotational position of the shaft; wherein a direction of the first current is opposite a direction of the second current.

Variation 4 can include the electric motor-generator of variation 1, 2, or 3, wherein the rotor is made primarily of iron; and wherein the stator is made primarily of iron.

Variation 5 can include the electric motor-generator of variation 1, 2, or 3, wherein: the first plurality of electrical conductors and the second plurality of electrical conductors are made primarily of copper, aluminum, gold, silver, or any combination thereof; and the first coil and the second coil are made primarily of copper, aluminum, gold, silver, or any combination thereof.

Variation 6 can include the electric motor-generator of variation 1, 2, or 3, wherein the rotor is magnetically permeable, and wherein the stator is magnetically permeable.

Variation 7 can include the electric motor-generator of variation 1, 2, or 3, further comprising at least one voltage source electrically connected to the first coil to generate a first magnetic field that, when the first rotor segment is positioned within a first distance from the first coil, induces a second magnetic field in the first rotor segment so that the second portion of the first rotor segment has a first magnetic polarity and the third portion of the first rotor segment has a second magnetic polarity opposite the first magnetic polarity.

Variation 8 can include the electric motor-generator of variation 1, 2, or 3, wherein the at least one voltage source is electrically connected to the second coil to generate a third magnetic field that, when the second rotor segment is positioned within a second distance from the second coil, induces a fourth magnetic field in the second rotor segment so that the fifth portion of the second rotor segment has the second magnetic polarity and the sixth portion of the second rotor segment has the first magnetic polarity opposite the second magnetic polarity.

Variation 9 can include the electric motor-generator of variation 1, 2, or 3, further comprising: one or more first current rectifiers electrically connected to the first plurality of electrical conductors; and one or more second current rectifiers electrically connected to the second plurality of electrical conductors.

Variation 10 can include the electric motor-generator of variation 1, 2, or 3, wherein the controller is further configured to: determine a third rotational position of the shaft based on third sensor data from the rotary position sensor; drive the first current through at least the first plurality of electrical conductors based on the third rotational position of the shaft; while driving the first current through at least the first plurality of electrical conductors, drive the second current through at least the second plurality of electrical conductors based on the third rotational position of the shaft.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. An electric motor-generator, comprising:
a stator;
at least two coils, including:
a first coil wrapped around a first portion of the stator; and
a second coil wrapped around a second portion of the stator;
a shaft;
a rotor mounted on the shaft and positioned in the stator, the rotor including:
a first rotor segment having a first portion, a second portion, and a third portion, wherein:
the first portion is mounted on the shaft;
the second portion is connected to the first portion and extends in a first outward radial direction toward the stator;
the third portion is connected to the first portion and extends in a second outward radial direction toward the stator;
a second rotor segment having a fourth portion, a fifth portion, and a sixth portion, wherein:
the fourth portion is mounted on the shaft;
the fifth portion is connected to the fourth portion and extends in a third outward radial direction toward the stator;
the sixth portion is connected to the fourth portion and extends in a fourth outward radial direction toward the stator;
a first plurality of electrical conductors extending along a first inner surface of the stator in a first direction parallel to a longitudinal axis of the stator, the first plurality of electrical conductors being positioned between the first coil and the second coil;
a second plurality of electrical conductors extending along a second inner surface of the stator in the first direction, the second plurality of electrical conductors being positioned between the first coil and the second coil;
a rotary position sensor operably coupled to the shaft; and
a controller in communication with the rotary position sensor and configured at least to:
determine a first rotational position of the shaft based on first sensor data from the rotary position sensor;

drive a first current through at least the first plurality of electrical conductors based on the first rotational position of the shaft;

while driving the first current through at least the first plurality of electrical conductors, drive a second current through at least the second plurality of electrical conductors based on the first rotational position of the shaft;

determine a second rotational position of the shaft based on second sensor data from the rotary position sensor;

drive the second current through at least the first plurality of electrical conductors based on the second rotational position of the shaft; and while driving the second current through at least the first plurality of electrical conductors, drive the first current through at least the second plurality of electrical conductors based on the second rotational position of the shaft;

wherein a direction of the first current is opposite a direction of the second current.

2. The electric motor-generator of claim 1, wherein the rotor is made primarily of iron; and wherein the stator is made primarily of iron.

3. The electric motor-generator of claim 1, wherein:

the first plurality of electrical conductors and the second plurality of electrical conductors are made primarily of copper, aluminum, gold, silver, or any combination thereof; and the first coil and the second coil are made primarily of copper, aluminum, gold, silver, or any combination thereof.

4. The electric motor-generator of claim 1, wherein the rotor is magnetically permeable, and wherein the stator is magnetically permeable.

5. The electric motor-generator of claim 1, further comprising at least one voltage source electrically connected to the first coil to generate a first magnetic field that, when the first rotor segment is positioned within a first distance from the first coil, induces a second magnetic field in the first rotor segment so that the second portion of the first rotor segment has a first magnetic polarity and the third portion of the first rotor segment has a second magnetic polarity opposite the first magnetic polarity.

6. The electric motor-generator of claim 5, wherein the at least one voltage source is electrically connected to the second coil to generate a third magnetic field that, when the second rotor segment is positioned within a second distance from the second coil, induces a fourth magnetic field in the second rotor segment so that the fifth portion of the second rotor segment has the second magnetic polarity and the sixth portion of the second rotor segment has the first magnetic polarity opposite the second magnetic polarity.

7. The electric motor-generator of claim 1, further comprising:

one or more first current rectifiers electrically connected to the first plurality of electrical conductors; and one or more second current rectifiers electrically connected to the second plurality of electrical conductors.

8. The electric motor-generator of claim 1, wherein the controller is further configured to:

determine a third rotational position of the shaft based on third sensor data from the rotary position sensor;

drive the first current through at least the first plurality of electrical conductors based on the third rotational position of the shaft;

while driving the first current through at least the first plurality of electrical conductors, drive the second current through at least the second plurality of electrical conductors based on the third rotational position of the shaft.

9. An electric motor-generator, comprising:

a stator;

at least two coils, including:

a first coil wrapped around a first portion of the stator; and a second coil wrapped around a second portion of the stator;

a shaft;

a rotor mounted on the shaft and positioned in the stator, the rotor including:

a first rotor segment having a first portion, a second portion, and a third portion, wherein:

the first portion is mounted on the shaft;

the second portion is connected to the first portion and extends in a first outward radial direction toward the stator;

the third portion is connected to the first portion and extends in a second outward radial direction toward the stator;

a second rotor segment having a fourth portion, a fifth portion, and a sixth portion, wherein:

the fourth portion is mounted on the shaft;

the fifth portion is connected to the fourth portion and extends in a third outward radial direction toward the stator;

the sixth portion is connected to the fourth portion and extends in a fourth outward radial direction toward the stator;

a first plurality of electrical conductors extending along a first inner surface of the stator in a first direction parallel to a longitudinal axis of the stator;

a second plurality of electrical conductors extending along a second inner surface of the stator in the first direction;

a rotary position sensor operably coupled to the shaft; and a controller in communication with the rotary position sensor and configured at least to:

determine a first rotational position of the shaft based on first sensor data from the rotary position sensor;

drive a first current through at least the first plurality of electrical conductors based on the first rotational position of the shaft;

while driving the first current through at least the first plurality of electrical conductors, drive a second current through at least the second plurality of electrical conductors based on the first rotational position of the shaft;

determine a second rotational position of the shaft based on second sensor data from the rotary position sensor;

drive the second current through at least the first plurality of electrical conductors based on the second rotational position of the shaft; and while driving the second current through at least the first plurality of electrical conductors, drive the first current through at least the second plurality of electrical conductors based on the second rotational position of the shaft;

wherein a direction of the first current is opposite a direction of the second current.

10. The electric motor-generator of claim 9, wherein the rotor is made primarily of iron; and wherein the stator is made primarily of iron.

11. The electric motor-generator of claim 9, wherein:
the first plurality of electrical conductors and the second plurality of electrical conductors are made primarily of copper, aluminum, gold, silver, or any combination thereof; and
the first coil and the second coil are made primarily of copper, aluminum, gold, silver, or any combination thereof.

12. The electric motor-generator of claim 9, wherein the rotor is magnetically permeable, and wherein the stator is magnetically permeable.

13. The electric motor-generator of claim 9, further comprising at least one voltage source electrically connected to the first coil to generate a first magnetic field that, when the first rotor segment is positioned within a first distance from the first coil, induces a second magnetic field in the first rotor segment so that the second portion of the first rotor segment has a first magnetic polarity and the third portion of the first rotor segment has a second magnetic polarity opposite the first magnetic polarity.

14. The electric motor-generator of claim 13, wherein the at least one voltage source is electrically connected to the second coil to generate a third magnetic field that, when the second rotor segment is positioned within a second distance from the second coil, induces a fourth magnetic field in the second rotor segment so that the fifth portion of the second rotor segment has the second magnetic polarity and the sixth portion of the second rotor segment has the first magnetic polarity opposite the second magnetic polarity.

15. An electric motor-generator, comprising:
a stator;
at least two coils, including:
a first coil wrapped around a first portion of the stator; and
a second coil wrapped around a second portion of the stator;
a shaft;
a rotor mounted on the shaft and positioned in the stator, the rotor including:
a first rotor segment having a first portion, a second portion, and a third portion, wherein:
the first portion is mounted on the shaft;
the second portion is connected to the first portion and extends in a first outward radial direction toward the stator;
the third portion is connected to the first portion and extends in a second outward radial direction toward the stator;
a second rotor segment having a fourth portion, a fifth portion, and a sixth portion, wherein:
the fourth portion is mounted on the shaft;
the fifth portion is connected to the fourth portion and extends in a third outward radial direction toward the stator;
the sixth portion is connected to the fourth portion and extends in a fourth outward radial direction toward the stator;
a first plurality of electrical conductors extending along a first inner surface of the stator in a first direction parallel to a longitudinal axis of the stator;
a second plurality of electrical conductors extending along a second inner surface of the stator in the first direction;
a rotary position sensor operably coupled to the shaft; and
a controller in communication with the rotary position sensor and configured at least to:
determine a first rotational position of the shaft based on first sensor data from the rotary position sensor;
drive a first current through at least the first plurality of electrical conductors based on the first rotational position of the shaft;
drive a second current through at least the second plurality of electrical conductors based on the first rotational position of the shaft;
determine a second rotational position of the shaft based on second sensor data from the rotary position sensor;
drive the second current through at least the first plurality of electrical conductors based on the second rotational position of the shaft; and
drive the first current through at least the second plurality of electrical conductors based on the second rotational position of the shaft;
wherein a direction of the first current is opposite a direction of the second current.

16. The electric motor-generator of claim 15, wherein the rotor is made primarily of iron; and wherein the stator is made primarily of iron.

17. The electric motor-generator of claim 15, wherein:
the first plurality of electrical conductors and the second plurality of electrical conductors are made primarily of copper, aluminum, gold, silver, or any combination thereof; and
the first coil and the second coil are made primarily of copper, aluminum, gold, silver, or any combination thereof.

18. The electric motor-generator of claim 15, wherein the rotor is magnetically permeable, and wherein the stator is magnetically permeable.

19. The electric motor-generator of claim 15, further comprising at least one voltage source electrically connected to the first coil to generate a first magnetic field that, when the first rotor segment is positioned within a first distance from the first coil, induces a second magnetic field in the first rotor segment so that the second portion of the first rotor segment has a first magnetic polarity and the third portion of the first rotor segment has a second magnetic polarity opposite the first magnetic polarity.

20. The electric motor-generator of claim 19, wherein the at least one voltage source is electrically connected to the second coil to generate a third magnetic field that, when the second rotor segment is positioned within a second distance from the second coil, induces a fourth magnetic field in the second rotor segment so that the fifth portion of the second rotor segment has the second magnetic polarity and the sixth portion of the second rotor segment has the first magnetic polarity opposite the second magnetic polarity.

* * * * *